July 4, 1967  J. F. PETERSEN  3,329,170

FLUID PRESSURE CONTROL VALVE

Filed Dec. 17, 1964

John F. Petersen
INVENTOR.

BY *Oliver D. Olson*

Agent

United States Patent Office 3,329,170
Patented July 4, 1967

3,329,170
FLUID PRESSURE CONTROL VALVE
John F. Petersen, Beaverton, Oreg., assignor to Real Estate Securities, Inc., Portland, Oreg., a corporation of Oregon
Filed Dec. 17, 1964, Ser. No. 419,052
10 Claims. (Cl. 137—625.69)

This invention relates to fluid pressure control valves, and more particularly to the type of control valve which provides for the sealing of the outlet port from inlet and exhaust ports.

There are many applications requiring the control of fluid pressure from a source to a fluid pressure-operated device. Typical of these is the reversible operation of a movable piston within an elongated cylinder, driven by pneumatic or hydraulic fluid pressure from a driven air or hydraulic pump. The control of fluid pressure to and from opposite ends of the cylinder generally is provided by a valve which, in a neutral position of adjustment interconnects the pump outlet and both ends of the cylinder to the return side of the pump, in a pressure feed position of adjustment connects the pump outlet to one end of the cylinder and the opposite end of the cylinder to the return side of the pump; and in a hold position of adjustment seals the pump outlet from both sides of the cylinder and also seals the pump outlet and both ends of the cylinder from the return side of the pump.

The primary disadvantage of control valves of the prior art, as described hereinbefore, resides in the fact that, in said hold position of adjustment the pump outlet is sealed from the pump inlet. Accordingly, while the piston is maintained in a predetermined position of adjustment within the cylinder, the pump is caused to operate at maximum load since the fluid pressure at the pump outlet is not relieved.

Accordingly, it is the principal object of the present invention to provide a fluid pressure control valve of the class described, wherein the hold position effectively seals the fluid pressure outlet from the fluid pressure inlet and exhaust outlet, while simultaneously interconnecting the fluid pressure inlet and exhaust outlet, whereby to maintain a fluid pressure-operated device held in a predetermined position while permitting operation of the fluid pressure pump under conditions of no load.

Another important object of this invention is the provision of a fluid pressure control valve of the class described, which is versatile in its utility, is precise in its operation and is of simplified construction for economical manufacture.

Figure 3:
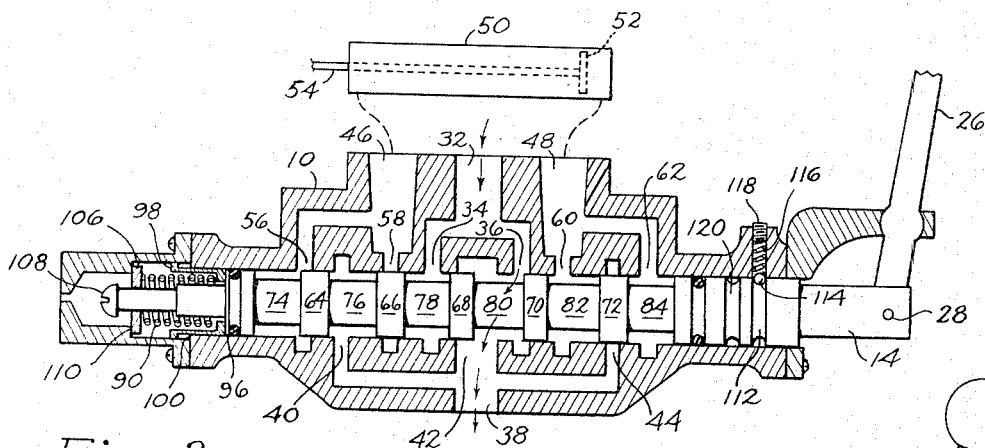
Figure 2:
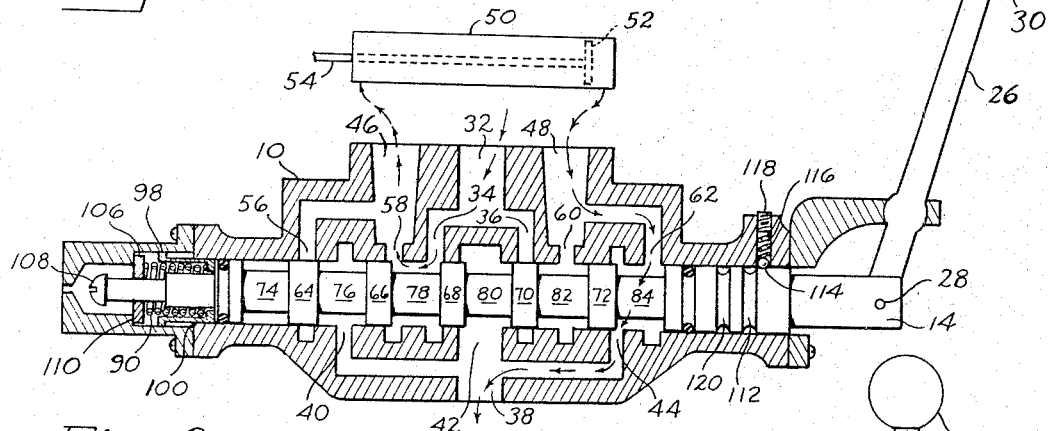
Figure 1:
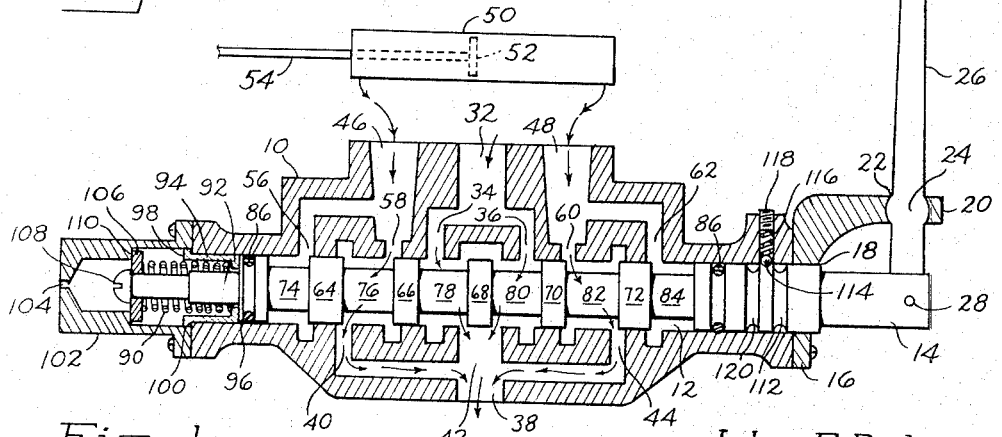

The foregoing and other objects and advantages of this invention will appear from the following detailed description, taken in connection with the accompanying drawings in which:

FIG. 1 is a longitudinal sectional view of a fluid pressure control valve embodying the features of the present invention, the components thereof shown in the neutral position of adjustment and associated with a schematic representation of a fluid pressure-operated device, with dash arrow lines illustrating the flow of fluid;

FIG. 2 is a view similar to FIG. 1 but showing the components of the valve adjusted to a feed position and showing by dash arrow lines the supplying of fluid under pressure to one end of the fluid pressure-operated device and the exhausting of fluid from the opposite end of the fluid pressure-operated device; and FIG. 3 is a view similar to FIGS. 1 and 2 but showing components of the control valve adjusted to the hold position.

In the embodiment illustrated in the drawing, the control valve comprises a valve housing 10 having an elongated bore 12 therethrough slidably receiving the elongated valve member 14. The housing and valve member are movable relative to each other and, although the valve housing may be arranged to move relative to a fixed valve member, the arrangement illustrated provides for movement of the valve member relative to the fixed housing.

Thus, an end cap 16 is secured removably to one end of the housing, being provided with an opening 18 coaxial with the housing bore 12 for receiving the valve member therethrough. An outwardly projecting flange 20 on the cap is shown, schematically, provided with a bearing socket 22 pivotally supporting the intermediate boll portion 24 of the (operating level 26. One end of the lever is connected pivotally to the adjacent end of the valve member, by means of the pivot pin 28, and the opposite, projecting end of the lever is provided with a hand knob 30.

The valve housing is provided with an inlet port 32 adapted to be connected at the outer side of the housing to the outlet of a fluid pressure pump (not shown). The inner end of the inlet port communicates with a pair of longitudinally spaced inlet ports 34, 36 which, in turn, communicate to their inner ends with the longitudinal bore 12 in the housing.

Similarly, the housing is provided with an exhaust port 38 adapted to be connected at its outer end to the inlet of the fluid pressure pump. The inner end of the exhaust port communicates with three longitudinally spaced exhaust ports 40, 42, 44 which, in turn, communicate at their inner ends with the longitudinal bore in the housing.

The housing also is provided with a pair of fluid pressure outlet ports 46 and 48 positioned at opposite sides of the inlet port 32 and adapted for connection at their outer ends to opposite ends of a fluid pressure-operated device. Such a device is illustrated schematically in the drawings by the elongated cylinder 50 in which a piston 52 is capable of reciprocative movement. A piston rod 54 is connected at one end to the piston and projects outward through one end of the cylinder for attachment to a device to be operated.

The inner end of outlet port 46 communicates with the longitudinally spaced pair of outlet ports 56, 58 both positioned on the same side of the adjacent inlet port 34 and both communicating at their inner ends with the longitudinal bore in the housing. Similarly, the other outlet port 48 communicates at its inner end with the longitudinally spaced pair of outlet ports 60, 62 both positioned longitudinally outward from the other inlet port 36 and both communicating at their inner ends with the longitudinal bore in the housing.

The elongated valve member is provided, intermediate its ends with a plurality of port sealing and port opening surfaces. Thus, in the embodiment illustrated, the intermediate portion of the valve member comprises a stem having a diameter smaller than the diameter of the bore in the housing and a length somewhat greater than the distance between the outermost fluid pressure outlet ports 58 and 62. Supported at longitudinally spaced intervals on this stem are a plurality of port closure elements each having a diameter substantially the same as the diameter of the bore in the housing. Thus, the outer surfaces of the port closure elements 64, 66, 68, 70 and 72 serve to removably seal the inner ends of the inlet, exhaust and outlet ports, and the outer surfaces of the stem sections 74, 76, 78, 80, 82 and 84 adjacent the port closure elements serve to provide communication between various of the ports.

Fluid seals are provided adjacent the opposite ends of the intermediate stem portion of the valve member. In the embodiment illustrated these seals are provided by resilient O-rings 86 mounted in annular grooves in the valve member and slidably engaging the housing wall defining the longitudinal bore 12.

The port sealing elements are spaced apart along the length of the intermediate stem portion of the valve member, for cooperation with various ports, to provide the mode of operation now to be described. Thus, FIG. 1 of the drawing illustrates the neutral position of the valve member relative to the housing, with the operating lever 26 extending substantially normal to the axis of the valve member. In this position the central port closure element 68 is centered across the inner end of the central exhaust port 42 and, being narrower than the latter, allows communication of said exhaust port with the fluid pressure inlet ports 34, 36 via the adjacent port opening surfaces 78, 80 of the stem. Accordingly, fluid from the pump outlet may circulate freely, under conditions of no load, into the inlet port 32 and out the exhaust port 38, back to the pump inlet, as indicated by the arrows.

Similarly, the port closure elements 66 and 79 are disposed away from the inner fluid pressure outlet ports 58 and 60, and the port closure elements 64 and 72 are disposed away from the outer exhaust ports 40 and 44 thereby providing communication between the outlet ports 58, 60 and exhaust ports 40, 44, respectively. Thus, the opposite ends of the cylinder 50 communicate with the inlet side of the pump, permitting free movement of the piston 52 in either direction within the cylinder.

Referring now to FIG. 2 of the drawing, the operating lever 26 has been pivoted clockwise and the valve member 14 has been moved toward the left to the pressure feed position illustrated. Thus, the port opening surface 78 of the stem between the central port closure element 68 and the one 66 to the left of it, spans the fluid pressure inlet port 34 and fluid pressure outlet port 58, providing commuincation between them for the feeding of fluid pressure from the pump outlet to the left hand end of the cylinder 50. Simultaneously, the central port closure element 68 and the one 70 to the right of it seal both of the fluid pressure inlet ports 34, 36 from the exhaust port 42. Also, the port closure element 72 farthest to the right has been moved to provide communication between the outer outlet port 62 and exhaust port 44 at the right hand end of the housing, thereby exhausting the right hand end of the cylinder 50 to the inlet side of the pump. Accordingly, the piston is caused to move toward the right, as indicated.

When the piston has moved toward the right to a predetermined desired position, the control lever 26 is pivoted counterclockwise to the hold position illustrated in FIG. 3. This hold position is intermedate the neutral and feed positions illustrated in FIGS. 1 and 2, respectively. In the hold position, the port closure elements 64, 66 and 70, 72 to the left and right of the central port closure element 68 have been moved to seal all of the fluid pressure outlet ports 56, 58, 60 and 61 from the exhaust ports 40, 42 and 44 and from the fluid pressure inlet ports 34 and 36. Thus, the opposite ends of the cylinder are closed, effectively holding the piston in the adjusted position.

Simultaneously with the foregoing, the port opening surface 80 between the central port closure element 68 and the one 70 to the right of it, bridges the right hand fluid pressure inlet port 36 and also the central exhaust port 42, providing communication therebetween. Accordingly, the fluid pressure pump may continue to operate, but under conditions of no load, to circulate fluid from the pump outlet back to the pump inlet, as indicated by the arrows.

It will be understood that driving of the piston 52 toward the left hand end of the cylinder 50 may be effected by pivoting the control lever 26 counterclockwise from the neutral position illustrated in FIG. 1, to the position in which valve member 14 toward the right to the position in which the port opening surface 80 between the central port closure element 68 and the one 70 to the right of it bridges the fluid pressure inlet port 36 and the adjacent fluid pressure outlet port 60, to supply fluid pressure from the pump outlet to the right hand end of the cylinder 50, and to move the port closure element 64 farthest to the left to the position at which the adjacent port opening surface 74 provides communication between the fluid pressure outlet port 56 and the exhaust port 40 at the left hand side of the housing, to exhaust the left hand end of the cylinder back to the pump inlet.

When the piston 52 has been moved toward the left to a predetermined position, it may be held there by pivoting the control lever 26 clockwise to the associated hold position, as will be apparent.

Means preferably is provided for urging the valve member 14 normally to the neutral position illustrated in FIG. 1. In the embodiment illustrated, such means is provided by the spring assembly shown at the left hand of the housing. An elongated coil spring 90 encircles the left hand end portion of the valve member and abuts at its inner end freely against the inner end 92 of the hollow sleeve 94. This sleeve also freely encircles the valve member, as well as the inner portion of the spring, and its inner end is adapted to abut freely against a shoulder 96 on the valve member. The sleeve is contained freely within the housing bore 12, and its outer end is provided with an outwardly extending flange 98 adapted to abut freely against a shoulder 100 provided by the left hand end of the housing. A hollow cap 102 is secured removably to said left hand end of the housing and servies to enclose the outwardly projecting portion of the spring assembly. An opening 104 in the end of the cap vents the interior thereof to the atmosphere, to provide free movement of the valve member, as will be apparent.

The outer end of the coil spring 90 abuts freely against collar 106 supported freely at the end of the valve member and retained thereon by the abutment screw 108. The collar is adapted to abut freely against a shoulder 110 provided in the cap 102.

In the neutral position illustrated in FIG. 1, the spring 90 has urged the collar 106 into abutment with the screw 108 and shoulder 110, and has urged the flange 98 of the sleeve 94 into abutment with the shoulder 100. The inner end 92 of the sleeve is in substantial abutment with the shoulder 96 on the valve member.

When the operating lever is pivoted clockwise to the feed position illustrated in FIG. 2, movement of the valve member toward the left compresses the spring 90 and moves the flange 98 of a sleeve toward the left away from the shoulder 100 and also moves the abutment screw 108 toward the left away from the collar 106. Thus, it will be apparent that this movement of the valve member toward the left is accomplished against the resistance of the spring.

When the control lever 26 is pivoted counterclockwise from the neutral position illustrated in FIG. 1, moving the valve member toward the right from the position illustrated in FIG. 1, it will be appreciated that the collar 106 also is moved toward the right, away from the shoulder 110. However, the sleeve 94 cannot move toward the right because of the abutment of the flange 92 against the shoulder 100. Accordingly, the spring 90 compresses in resistance to such movement of the valve member, providing a force which urges the valve member back toward the neutral position.

Since the spring 90 urges the valves member 14 toward the neutral position illustrated in FIG. 1, it is preferred that means be provided for securing the valve member releasably in the hold position illustrated in FIG. 3. Such means is provided, in the embodiment illustrated, by the annular groove 112 in the valve member located, in the hold position, in alignment with a detent ball 114. The ball is contained in an opening in the housing and is urged resiliently toward the valve member by means of the backing spring 116 confined in the opening behind the adjustment screw 118. Adjustment of the latter provides the desired degree of force against the detent ball to hold the valve member in the hold position, against the tension of the centering spring 90.

A second annular groove 120 in the valve member is arranged to align with the detent ball 114 when the valve member is moved to the second hold position associated with the pressure feeding to the right hand end of the cylinder, as described hereinbefore.

The control valve described hereinbefore may be utilized to control the operation of a fluid pressure-operated device in which fluid pressure is required only for actuating the device in one direction. For example, the right hand end of the cylinder 50 illustrated in the drawing may be open to the atmosphere, with that end of the piston being in abutment with an elongated coil spring confined within the cylinder to urge the piston toward the left to its maximum limit. In such case it will be appreciated that the fluid pressure outlet ports 60, 62 to the right of the fluid pressure inlet port 36, are not utilized and therefore may be omitted together with the associated right hand exhaust port 44 and cooperating port closing and port opening components of the valve member. However, the remaining components of the valve assembly function to provide the neutral, pressure feed and hold conditions described hereinbefore.

The control valve of the present invention is particularly useful in the control of hydraulic fluid pressure derived from a hydraulic pump of the positive displacement type. In this regard the valve enables the continuous operation of the pump under optimum conditions of no load when the valve is in the neutral and hold positions illustrated in FIGS. 1 and 3, respectively.

It will be apparent to those skilled in the art that various changes may be made in the size, shape and arrangement of parts described hereinbefore. For example, the valve housing 10 and valve member 14, together with the cooperating ports and port sealing and port closing surfaces may be arranged to provide for relative axial rotation of the housing and valve member, rather than the relative longitudinal movement provided for in the embodiment illustrated. Various other changes may be made, as desired, without departing from the spirit of this invention and the scope of the appended claims.

Having now described my invention and the manner in which is may be used, what I claim as new and desire to secure by Letters Patent is:

1. A fluid pressure control valve comprising
   (a) a hollow housing,
   (b) a valve member in the housing,
   (c) the housing and valve member being movable relative to each other between neutral, feed and hold positions,
   (d) the housing and valve member having cooperating spaced ports and port opening and port closing surfaces, wherein the ports define a fluid pressure inlet port, an exhaust port and a fluid pressure outlet port, the ports and surfaces being arranged
   (e) in said neutral position to communicate the inlet and outlet ports with the exhaust port,
   (f) in said feed position to communicate the outlet port with the inlet port and to seal the inlet port from the exhaust port, and
   (g) in said hold position to communicate the inlet port with the exhaust port and to seal the outlet port from the inlet and exhaust ports.

2. The control valve in claim 1 wherein the ports are provided in the housing and the port opening and port closing surfaces are provided on the valve member.

3. A fluid pressure control valve comprising
   (a) a hollow housing,
   (b) a valve member in the housing,
   (c) the housing and valve member being movable relative to each other between neutral, feed and hold positions,
   (d) the housing and valve member having cooperating spaced ports and port opening and port closing surfaces, wherein the ports define a fluid pressure inlet port, an exhaust port and a pair of fluid pressure outlet ports spaced apart in the direction of said relative movement and wherein the port opening and port closing surfaces are spaced apart in the direction of said relative movement, the ports and surfaces being arranged
   (e) in said neutral position to communicate the inlet and outlet ports with the exhaust port,
   (f) in said feed position to communicate one of the outlet ports with the inlet port and the other outlet port with the exhaust port, and to seal the inlet port from the exhaust port, and
   (g) in said hold position to communicate the inlet port with the exhaust port and to seal the outlet ports from each other and from the inlet and exhaust ports.

4. The control valve of claim 3 wherein the valve member is elongated and the housing and valve member are movable relative to each other in the longitudinal direction of the valve member.

5. The control valve of claim 3 wherein the valve member is elongated and is movable relative to the housing in the longitudinal direction of said valve member.

6. The control valve of claim 3 wherein the hold position is intermediate the neutral and feed positions.

7. The control valve of claim 3 wherein the hold position is intermediate the neutral and feed positions, and means releasably interengages the housing and valve member in said hold position for maintaining said hold position.

8. The control valve of claim 3 wherein
   (a) the end of the inlet port at the interface between the housing and valve member comprises a pair of inlet ports spaced apart in the direction of said relative movement of the housing and valve member,
   (b) the end of each outlet port at the interface between the housing and valve member comprises a pair of outlet ports spaced apart in the direction of said relative movement of the housing and valve member and both positioned on the same side of the adjacent one of the pair of inlet ports, and
   (c) the end of the exhaust port at the interface between the housing and valve member comprises three exhaust ports spaced apart in the direction of said relative movement of the housing and valve member,
   (d) the port sealing and port opening surfaces being arranged
   (e) in said neutral position to communicate both of the pair of inlet ports with the central exhaust port and the inner one of each pair of outlet ports one with each of the outer exhaust ports.
   (f) in said feed position to communicate the inner one of one of the pair of outlet ports with the adjacent inlet port and to seal the outer one of said one pair of outlet ports from the inlet and exhaust ports, and to communicate the outer one of the other pair of outlet ports with the adjacent outer exhaust port and to seal the inner one of said other pair of outlet ports from the adjacent inlet port, and
   (g) in said hold position to communicate one of the pair of inlet ports with the central exhaust port and to seal all outlet ports from all inlet and exhaust ports.

9. The control valve of claim 3 wherein the valve member is elongated and the housing and valve member are movable relative to each other in the longitudinal direction of the valve member, the posts are provided in the housing, and the port opening and port closing surfaces are provided on the valve member.

10. The control valve of claim 9 wherein
    (a) the inner end of the inlet port communicating with the valve member comprises a pair of inlet ports spaced apart in the longitudinal direction of said relative movement of the housing and valve member,
    (b) the inner end of each outlet port communicating with the valve member comprises a pair of outlet ports spaced apart in the longitudinal direction of said relative movement of the housing and valve member and both positioned outward of the adjacent one of the pair of inlet ports, and (c) the inner end of the exhaust port communicating with the valve member comprises three exhaust ports spaced apart in the longitudinal direction of said relative movement of the housing and valve member, (d) the port sealing and port opening surfaces of the valve member being arranged (e) in said neutral position to communicate both of the pair of inlet ports with the central exhaust port and the inner one of each pair of outlet ports one with each of the outer exhaust ports, (f) in said feed position to communicate the inner one of one of the pair of outlet ports with the adjacent inlet port and to seal the outer one of said one pair of outlet ports from the inlet and exhaust ports, and to communicate the outer one of the other pair of outlet ports with the adjacent outer exhaust port and to seal the inner one of said other pair of outlet ports from the adjacent inlet port, and (g) in said hold position to communicate one of the pair of inlet ports with the central exhaust port and to seal all outlet ports from all inlet and exhaust ports.

References Cited

UNITED STATES PATENTS

| | | | |
|---|---|---|---|
| 2,702,529 | 2/1955 | Deerfner | 137—625.69 |
| 2,798,461 | 7/1957 | Gold et al. | 137—625.69 |
| 2,946,144 | 7/1960 | Anderson | 137—625.69 X |
| 3,212,522 | 10/1965 | Williams | 137—596.12 |

M. CARY NELSON, *Primary Examiner.*

H. KLINKSIEK, *Assistant Examiner.*